(12) United States Patent
Vishnu et al.

(10) Patent No.: US 8,650,435 B2
(45) Date of Patent: Feb. 11, 2014

(54) ENHANCED STORAGE DEVICE REPLACEMENT SYSTEM AND METHOD

(75) Inventors: Murty K. Vishnu, Andhra Pradesh (IN);
Syam Sreedhar M. Deepu, Kerala (IN);
A. S. Nagendra, Karnataka (IN);
Agarwal Sandeep, Rajasthan (IN);
Kumar Vaibhav, Haryana (IN)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 13/155,554

(22) Filed: Jun. 8, 2011

(65) Prior Publication Data

US 2012/0317439 A1 Dec. 13, 2012

(51) Int. Cl.
*G06F 11/00* (2006.01)

(52) U.S. Cl.
USPC ............ 714/6.1; 714/6.2; 714/6.21; 714/6.22

(58) Field of Classification Search
USPC .................................. 714/6.1, 6.2, 6.21, 6.22
See application file for complete search history.

(56) References Cited

U.S. PATENT DOCUMENTS

| 6,598,174 | B1 * | 7/2003 | Parks et al. | 714/6.22 |
| 6,986,075 | B2 * | 1/2006 | Ackaret et al. | 714/4.5 |
| 7,069,382 | B2 | 6/2006 | Horn et al. | |
| 7,434,097 | B2 * | 10/2008 | Guha et al. | 714/6.32 |
| 8,386,838 | B1 * | 2/2013 | Byan | 714/6.2 |
| 2004/0260967 | A1 * | 12/2004 | Guha et al. | 714/3 |
| 2007/0050544 | A1 | 3/2007 | Chawla et al. | |
| 2011/0029711 | A1 | 2/2011 | Dhuse et al. | |
| 2011/0029728 | A1 | 2/2011 | Popovski et al. | |

* cited by examiner

*Primary Examiner* — Charles Ehne
(74) *Attorney, Agent, or Firm* — Terrile, Cannatti, Chambers & Holland, LLP; Robert W. Holland

(57) ABSTRACT

Recovery of a failed storage device of a RAID array to a replacement storage device is improved by initiating recovery before failure of the storage device occurs. If failure occurs before completing the transfer of all information from the failed storage device to the replacement storage device, then the RAID controller identifies untransferred information to recreate the failed storage device at the replacement storage device by re-building only the untransferred information with a parity operation using information stored at the array.

20 Claims, 2 Drawing Sheets

ENHANCED STORAGE DEVICE REPLACEMENT SYSTEM AND METHOD

BACKGROUND OF THE INVENTION

1. Field of the Invention

The present invention relates in general to the field of information handling system storage devices, and more particularly to enhanced storage device replacement system and method.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often generate and access large quantities of stored information. Reliable storage of information has become increasingly important for enterprises and individuals, with many important documents maintained only in electronic formats. To reduce the risk of information loss, information handling systems and networks typically maintain redundant copies of information on separate storage devices. One common storage technique for maintaining redundant copies of information is a Redundant Array of Independent Disks (RAID), which maintains redundant copies of information on separate non-volatile storage devices according to a variety of algorithms. For example, RAID-1 mirrors each storage device on another storage device so that either storage device can take over storage functions if the other storage device fails. Other RAID algorithms, such as RAID-5, use parity and/or striping to more efficiently store information. For example, rather than mirroring a complete hard disk drive, portions of stored information are mirrored to different hard disk drives to ensure redundancy. If a physical hard disk drive fails, it is re-created at a replacement hard disk drive with a parity operation that retrieves stripes from the other hard disk drives of the array.

One difficulty with re-creation of a storage device in a RAID array by a parity operation is that storage functions at the array must generally be kept up as the parity operation is performed. Thus, replacing a failed RAID storage device can be a complex task that takes a considerable amount of time and storage array resources. During the time taken to re-build a failed storage device, the array is susceptible to failure of another storage device, which may result in a permanent loss of data. Further, while information is transferred from existing storage devices to a replacement storage device, I/O performance is degraded. One attempt to address this difficulty is a "Replace Member" feature that allows an end user to replace a physical storage device that is part of a storage array with another storage device before a failure takes place. The Replace Member feature can be invoked manually by an end user or automatically by a RAID controller based upon a predicted failure of a storage device. Once the Replace Member function initiates, a direct copy of the source storage device that is being replaced is made to the replacement storage device. If the source storage device fails before the Replace Member function completes, then the Replace Member function cancels. The replacement storage device then has the source storage device rebuilt from other storage devices of the array using the normal parity operation.

SUMMARY OF THE INVENTION

Therefore a need has arisen for a system and method which provides enhanced storage device replacement in an array of storage devices.

In accordance with the present invention, a system and method are provided which substantially reduce the disadvantages and problems associated with previous methods and systems for rebuilding a failed storage device of a storage array at a replacement storage device. An incomplete transfer of information from a failing storage device to a replacement storage device is retained at the replacement storage device. Re-building the failed storage device at the replacement storage device is accomplished by retaining information stored on the replacement storage device from the incomplete transfer and completing the transfer with a parity operation supported by other storage devices of the array.

More specifically, a RAID controller initiates transfer of information from a first storage device to a second storage device, such as based upon an end user command or automatically upon a prediction of failure of the first storage device. If some but not all of the information is successfully transferred at the time of a failure of the first storage device, then the RAID controller identifies the untransferred portion and re-builds the untransferred portion at the second storage device using a parity operation to retrieve the untransferred portion from other storage devices of the RAID array. The RAID controller rebuilds the failed storage device at the second storage device by retaining information successfully transferred from the first storage device before its failure. For example, the RAID controller tracks stripes as copying is performed from the first storage device to the second storage device so that the RAID controller knows which stripes are successfully transferred. Once failure occurs, the RAID controller initiates a parity operation to re-build the first storage device with only those stripes that were not transferred during the copy operation.

The present invention provides a number of important technical advantages. One example of an important technical advantage is that efficiencies provided by a Replace Member operation are captured even if the Replace Member operation is not able to complete due to a source storage device failure during the operation. Rebuilding the failed storage device takes less time and less storage array resources by initiating the rebuild at the replacement storage device with a parity operation from the point at which copying of the source storage device was stopped during the replace member operation. A check point of the stripe at which the Replace Member operation stopped allows a start of the parity operation at the replacement storage device from the check point instead of rebuilding the storage device from scratch. The storage array becomes fully operational more quickly and rebuilding the failed storage device has a reduced impact on array I/O performance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
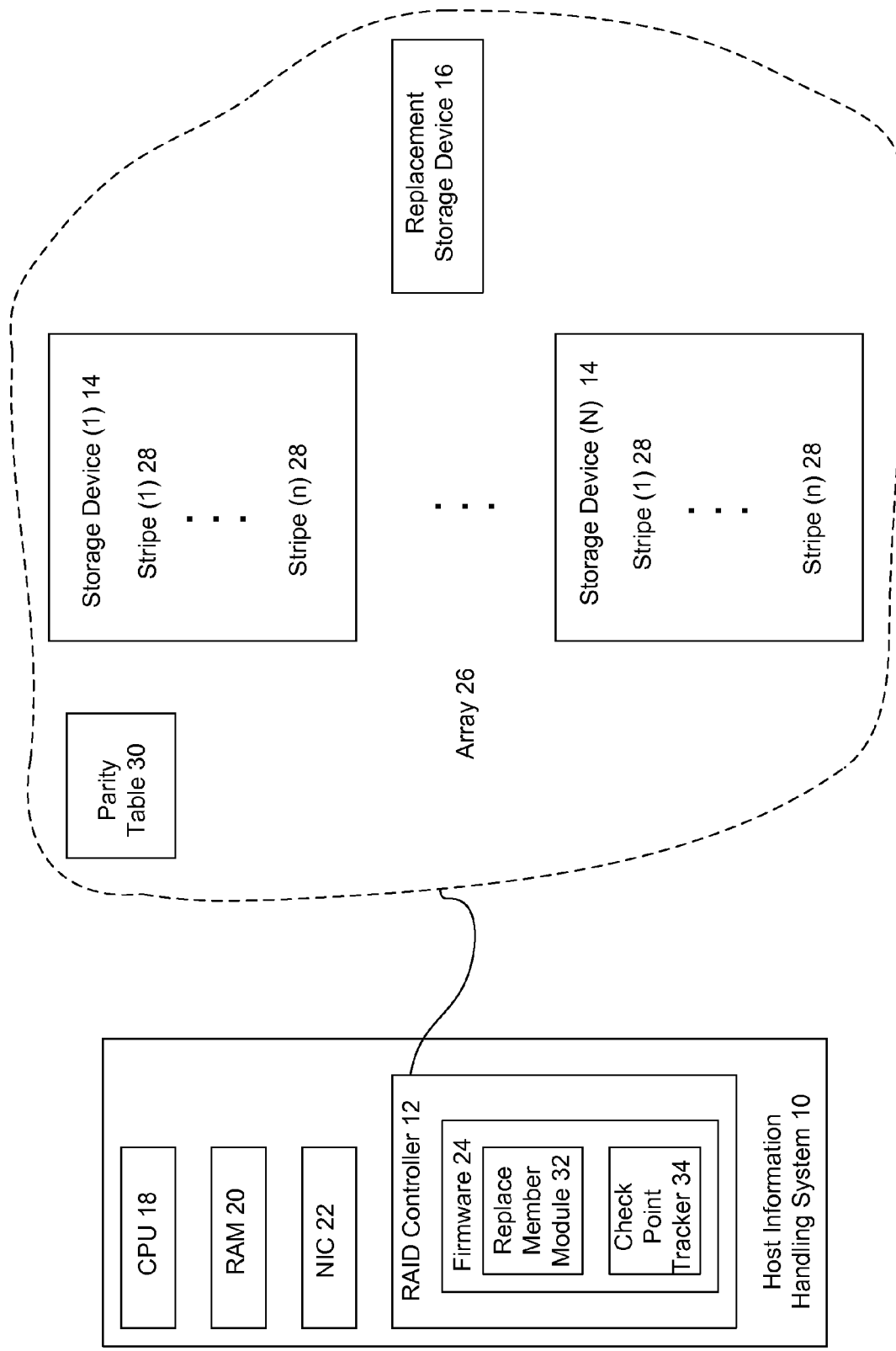
FIG. 1 depicts a block diagram of an information handling system having a RAID controller and storage devices that retain partial transfers made by a Replace Member operation to re-build the failed storage device at a replacement storage device.

Referring now to FIG. 1, a block diagram depicts an information handling system 10 having a RAID controller 12 and storage devices 14 that retain partial transfers made by a Replace Member operation to re-build the failed storage device at a replacement storage device 16. Storage devices 14 and 16 are, for example, hard disk drives, solid state drives or other types of non-volatile memory devices suitable for use in a storage array, such as a RAID array. Information handling system 10 processes information with a processor 18 that executes instructions in cooperation with memory 20. For example, information handling system 10 acts as a host to store and retrieve information in response to requests received from a network through a network interface card 22. RAID controller 12 includes a processor that executes firmware 24 to manage storage and retrieval from storage devices 14 as a storage array 26. In the example embodiment depicted by FIG. 1, a RAID-5 algorithm stores information using stripes 28 at each storage device 14 and a parity table 30 that supports redundancy in the storage of information. In alternative embodiments, alternative storage arrays that store information on plural storage devices 14 may be used. An "XOR" parity operation tracks stripes 28 to ensure that redundancy in the storage of information is accomplished across array 26 in the event of a storage device 14 failure. Should a storage device 14 fail, the parity operation supported by RAID controller 12 uses parity table 30 and parity bits associated with stripes 28 to re-build the failed storage device 14 at replacement storage device 16. A conventional parity operation typically incrementally retrieves stripes 28 that were stored on a failed storage device from operational storage devices and copies the retrieved stripes to the replacement storage device. During the parity operation to re-build a failed storage device, the performance of I/O operations at RAID controller 12 is typically impaired.

One difficulty with re-building a storage device 14 after failure occurs is that information may be permanently lost to the array 26 if another storage device 14 fails before completing the re-build of the first failed storage device at replacement storage device 16. A replace member module 32 executing on RAID controller 12 helps to alleviate this difficulty by initiating replacement of a storage device 14 before a failure occurs. For example, an end user can command a Replace Member operation before changing out a storage device or replace member module 32 can automatically initiate a Replace Member operation upon determining a prediction of a failure of a storage device 14. The Replace Member operation copies information from a selected storage device 14 to a replacement storage device 16 so that, upon completion of the Replace Member operation, replacement storage device 16 takes over the position in array 26 of the selected storage device 14.

In order to make a more effective use of a Replace Member operation, a check point tracker 34 executing as firmware module on RAID controller 12 tracks the Replace Member operation so that a partial copy of contents at a storage device 14 remain available for use in the event of a failure of storage device 14 before completing the Replace Member operation. For example, check point tracker 34 performs the copying of the Replace Member operation by incrementing through the stripes 28 of the storage device 14. As each stripe 28 copies successfully, check point tracker 34 check points the stripe and then increments to the next stripe. Upon detection of a failure of the storage device 14, check point tracker provides the check point of the last successful stripe copied to RAID controller 12 so that a parity operation to re-build the failed storage device 14 can begin from the check point rather than from the first stripe. Check point tracker 34 retains information at replacement storage device 16 copied successfully by a Replace Member operation so that the parity operation will not have to re-build the stripes 28 copied during the Replace Member operation. Instead, the parity operation begins a re-build of the failed storage device 14 at the replacement storage device 16 where the Replace Member operation left off.

Figure 2:
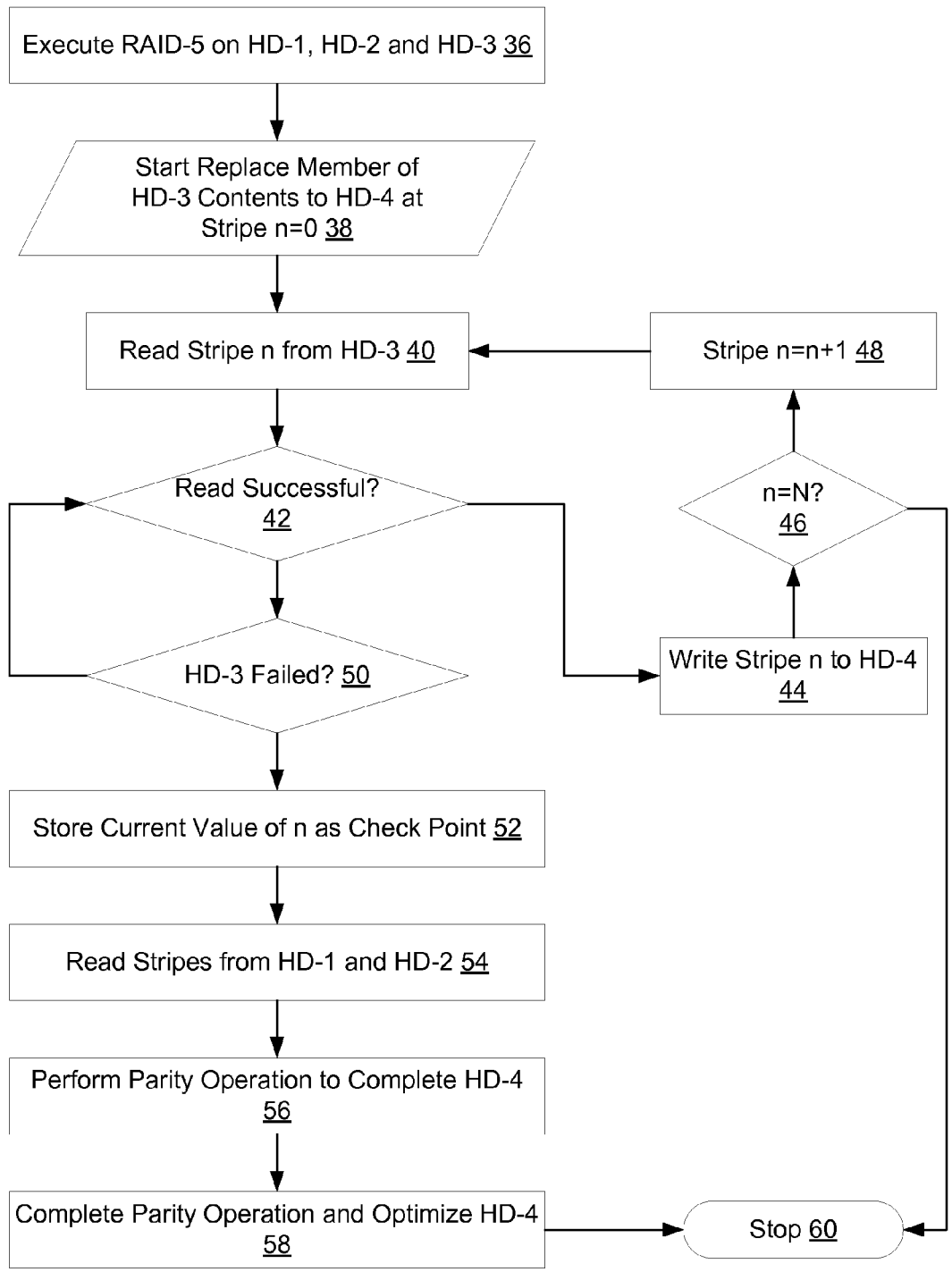
FIG. 2 depicts a flow diagram of a process for re-building a storage device using information copied from the failed storage device before its failure.

Referring now to FIG. 2, a flow diagram depicts a process for re-building a storage device using information copied from the failed storage device before its failure. The process begins at step 36 with operation of a RAID-5 algorithm having three or more hard disk drives and a replacement hard disk drive. Although a RAID-5 algorithm is used in the example embodiment, other types of a storage arrays may be used. At step 38, a Replace Member operation is initiated to replace a source hard disk drive HD-3 by copying its information to a replacement hard disk drive HD-4 starting with stripe n=0. For example, the process is initiated by selection of an end user or prediction of a failure imminent at HD-3. The process continues to step 40 to read the stripe n from HD-3. At step 42 a determination is made of whether the read of stripe n was successful. If yes, the process continues to step 44 to write stripe n to HD-4. At step 46, a determination is made of whether the stripe n is the final stripe N on HD-3. If yes, the process completes at step 60. If the determination at step 46 is no, the process continues to step 48 to increment to the next stripe n+1 and to step 40 to initiate copying of the next incremental stripe of HD-3 to HD-4.

If at step 42 the read from HD-3 is not successful, then a failure of HD-3 is indicated before completion of the Replace Member operation. The process continues to step 50 to determine if HD-3 has failed. If HD-3 has not failed, the process returns to step 42 to attempt to read the stripe n and continue to step 44 to complete the Replace Member operation if possible. Note that repeated failures to read a particular stripe without an actual failure of HD-3 may be addressed by performing a parity operation for the stripe and then continuing to the next incremental stripe. If at step 50 a determination is made that HD-3 has failed, the process continues to step 52 to re-build HD-3 at HD-4 by retaining the information already copied to HD-4 from HD-3 and performing a parity operation from the last successful stripe copied. At step 52, the value n reflecting the last successful stripe copied to HD-4 is check pointed for initiation of a parity operation to retrieve the remaining stripes of HD-3 from HD-1 and HD-2. At step 54, an XOR parity operation is performed to retrieve the untransferred portions of HD-3 as reflected by the stripe increment for storage with the retained transferred portions of HD-3 at HD-4. At step 58, the re-built portion is optimized to bring HD-4 into operation as a replacement for HD-3.

Although the present invention has been described in detail, it should be understood that various changes, substitutions and alterations can be made hereto without departing from the spirit and scope of the invention as defined by the appended claims.

What is claimed is:

1. A method for re-building information stored on a source storage device at a replacement storage device, the method comprising:
    copying some but not all of the information from the source storage device to the replacement storage device, the information stored in plural stripes, the copying performed one stripe at a time;
    tracking completion of the copying of each stripe;
    detecting a failure at the source storage device;
    retaining at the replacement storage device the information copied from the source storage device;
    retrieving from one or more secondary source storage devices to the replacement storage device the stripes needed to complete re-building the source storage device at the replacement storage device.

2. The method of claim 1 wherein the storage device comprises a hard disk drive.

3. The method of claim 1 wherein the secondary source storage devices comprise plural storage devices disposed in a storage array with the source storage device.

4. The method of claim 1 wherein copying some but not all of the information further comprises:
    predicting a failure of the source storage device;
    in response to the predicting, initiating the copying of the information from the source storage device to the replacement storage device; and
    failing at the source storage device before copying all information at the source storage device to the replacement storage device.

5. The method of claim 1 wherein copying some but not all of the information further comprises:
    copying a stripe from the source storage device to the replacement storage device; and
    incrementing sequentially to a next stripe to copy from the source storage device to the replacement storage device.

6. The method of claim 5 wherein detecting a failure further comprises storing a check point of the stripe last copied to the replacement storage device.

7. The method of claim 6 wherein retrieving from one or more secondary source storage devices to the replacement storage device the information needed to complete re-building the source storage device at the replacement storage device further comprises retrieving stripes from secondary storage devices of an array of storage devices, the stripes retrieved with a parity operation.

8. The method of claim 7 wherein the array comprises a RAID-5 array of plural storage devices.

9. An information handling system comprising:
    a processor operable to execute instructions;
    plural storage devices interfaced with the processor and operable to store information, including a source storage device, a replacement storage device, and one or more secondary source storage devices; and
    memory interfaced with the processor and storing instructions operable to:
    initiate transfer of all information stored at a source storage device to a replacement storage device, the information organized as stripes;
    tracking completion of transfer of information by completion of transfer of each stripe;
    detect failure of the source storage device after a transferred portion of the information is copied to the replacement storage device and before an untransferred portion is copied to the replacement storage device; and
    retrieve, in response to the failure, the untransferred portion from the one or more secondary storage devices to copy the untransferred portion to the replacement storage device, the untransferred portion identified as stripes that did not complete transfer.

10. The information handling system of claim 9 wherein the processor comprises a RAID controller.

11. The information handling system of claim 10 wherein the RAID controller executes as a RAID 5 storage array.

12. The information handling system of claim 10 wherein the storage devices comprise hard disk drives.

13. The information handling system of claim 10 wherein the storage devices comprise solid state drives.

14. The information handling system of claim 9 wherein the instructions are further operable to predict a failure of the source storage device and to automatically initiate transfer of information to the replacements storage device in response to the detecting.

15. The information handling system of claim 9 wherein the instructions are further operable to track the transferred portion by incrementally copying stripes from the source storage device to the replacement storage device.

16. The information handling system of claim 15 wherein the instructions are further operable to copy the untransferred portion with a parity operation.

17. A method for storing information in an array having plural storage devices, the array organizing the information as plural stripes at each of the plural storage devices, the method comprising:
    predicting failure of a first of the storage devices;
    in response to the predicting, initiating transfer of the information from the first storage device to a second storage device by incrementing through the stripes of the first storage device to copy each striped to the second storage device;
    detecting failure of a stripe to copy from the first storage device without detecting failure of the first storage device;

in response to detecting failure of a stripe to copy, rebuilding the stripe that failed to copy with a parity operation from the array and then continuing with the incrementing;

detecting failure of the first storage device before completing the transfer of the information to the second storage device;

identifying untransferred information that was not copied from the first storage device to the second storage device before the failure by identifying stripes that did not transfer from the first storage device to the second storage device; and retrieving the untransferred information from the array to the second storage device.

18. The method of claim 17 wherein the storage devices comprise a RAID array managed by a RAID controller.

19. The method of claim 17 wherein the identifying untransferred information further comprises tracking stripes of the information with a checkpoint as each stripe is completely copied from the first storage device to the second storage device.

20. The method of claim 19 wherein retrieving the untransferred information further comprises retrieving untransferred stripes using a parity operation.

* * * * *